Patented June 13, 1933

1,914,326

UNITED STATES PATENT OFFICE

REINHOLD FICK, OF MANNHEIM, GERMANY, ASSIGNOR TO I. G. FARBENINDUSTRIE AKTIENGESELLSCHAFT, OF FRANKFORT-ON-THE-MAIN, GERMANY

PRODUCTION OF ALKYLENE CYANHYDRINS

No Drawing. Application filed September 6, 1930, Serial No. 480,279, and in Germany September 18, 1929.

The present invention relates to the production of alkylene cyanhydrins.

It has already been proposed to prepare ethylene cyanhydrins from ethylene oxide and hydrocyanic acid. This method, however, furnishes bad yields and is sometimes objected to on account of the highly poisonous nature of hydrocyanic acid. On the other hand solutions of alkali metal cyanides have been treated with halogen hydrin but the yields of cyanhydrins are unsatisfactory and the products are not pure.

I have found that alkylene cyanhydrins are obtained in a very simple manner by acting with alkylene oxides on dispersions of alkaline cyanides, that is alkaline earth metal cyanides and alkali metal cyanides, in aqueous solvents, such as water, or aqueous solutions of alcohols. The temperatures of working are generally between about 10° and 70° C., temperatures between about 20° and 60° C. being usually employed. For example by bringing together ethylene oxide and an aqueous solution of calcium cyanide, ethylene cyanhydrin is immediately formed with the separation of calcium hydroxide according to the following equation

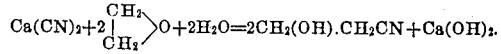

The resulting aqueous solution of the cyanhydrin may readily be separated from calcium hydroxide by filtration. The precipitation of the lime may be completed by passing carbon dioxide into the solution. The cyanhydrin formed may be recovered in the simplest manner from the aqueous solution by evaporation, and may be separated from any small amounts of impurities by fractionation in the usual manner. In the process described equimolecular proportions of alkylene oxide and alkaline cyanide are employed and in most cases the employment of alkaline earth metal cyanides will be preferred since they furnish better yields of cyanhydrins. In this process the alkaline earth metal hydroxides corresponding to the cyanides may be formed as by-products and only solutions of rather low concentration, say 20 per cent solutions, of alkaline earth metal cyanides are usually employed, so that comparatively dilute solutions of the alkylene cyanhydrins are obtained on the one hand and these must in part be concentrated by evaporation for the purpose of further working up, and on the other hand the alkaline earth metal hydroxides obtained must be filtered off and washed out. These drawbacks can be avoided by working in the following manner.

Instead of converting fresh alkaline earth metal cyanide with the equivalent amount of alkylene oxide, alkylene oxide and hydrocyanic acid can be combined in the presence of alkaline earth metal or alkali metal cyanides, preferably by leading alkylene oxide and hydrocyanic acid alternately or simultaneously into solutions of alkaline earth metal or alkali metal cyanides. It is also possible, instead of starting with the alkaline earth metal or alkali metal cyanides, to employ the corresponding hydroxides in solution or suspension and to convert these first into the cyanides by leading in hydrocyanic acid. The combination of a mixture of hydrocyanic acid and alkylene oxide may also be effected by the addition of a small amount of alkaline earth metal or alkali metal cyanide thereto.

In every case the hydrocyanic acid serving for the formation of the alkylene cyanhydrins is only employed partly in the form of its salts, the majority of the hydrocyanic acid being supplied to the reaction in the uncombined form. In this manner, by the ensuring, or simultaneously carrying out, conversion with alkylene oxides, concentrated solutions of the alkylene cyanhydrins are obtained, and it is thus possible by the employment of the cyanide solutions to accelerate the combination of ethylene oxide and hydrocyanic acid, which otherwise proceeds extremely sluggishly, to a reaction which proceeds almost momentarily. In this process the alkaline earth metal hydroxide formed in the first stage by the action of the alkylene oxide on the alkali metal or alkaline earth metal cyanides is converted into alkali metal or alkaline earth metal cyanides again by the addition of hydrocyanic acid, and this again forms alkylene cyanhydrin and alkali metal or alkaline earth metal hydroxides with the alkylene oxide, as for example according to the following equations:

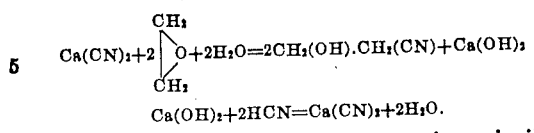

$$Ca(OH)_2 + 2HCN = Ca(CN)_2 + 2H_2O.$$

The alkali metal cyanides react in a similar manner with alkylene oxides, whereby the hydroxide first formed in this case is continually converted with fresh hydrocyanic acid with the re-formation of the cyanide, as for example according to the following equations:

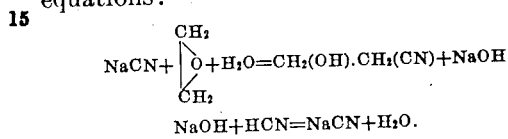

$$NaOH + HCN = NaCN + H_2O.$$

The relative concentration and the sequence of the addition of th cyanide, hydrocyanic acid and alkylene oxide may be varied a large extent, and the water may be partly replaced by other diluents, as for example alcohols, with the exception of the quantity of water required according to the above equations. It is preferable only to allow small amounts of alkylene oxide and hydrocyanic acid to react without interruption in order that the course of the reaction may be more readily regulated. Solutions containing more than 60 per cent of alkylene cyanhydrin, which may be readily freed from their small content of alkaline earth or alkali metal compounds, may be obtained without difficulty.

The following examples will further illustrate the nature of this invention, but the invention is not restricted to these examples. The parts are by weight.

Example 1

A mixture consisting of 660 parts of ethylene oxide and 1500 parts of water is allowed to flow at from 10° to 20° C. into a solution of 690 parts of calcium cyanide in 3600 parts of water while stirring. The reaction starts at once with slight evolution of heat and the whole is then stirred for about half an hour whereupon the calcium hydroxide which has separated out is removed by filtration by suction. In order completely to precipitate the lime, carbon dioxide is passed into the filtrate for a short time. The calcium carbonate which separates out is likewise filtered off. The resulting aqueous solution of about 1020 parts of ethylene cyanhydrin is practically free from inorganic and organic impurities and may be further worked as such without further purification, for example by saponification to the corresponding hydroxy carboxylic acid. An anhydrous product is obtained in a yield of 92 per cent of the theoretical yield by evaporating off the water under reduced pressure, particularly pure ethylene cyanhydrin with a boiling point of from 120° to 122° C. at 20 millimeters mercury gauge being obtained. The order and manner of mixing the initial materials may be varied within wide limits; thus for example vapors of ethylene oxide may be introduced into the solution of calcium cyanide.

The corresponding cyanhydrins may also be prepared from the homologues of ethylene oxide, such as propylene oxide, butylene oxide and the like, in an analogous manner.

Example 2

870 parts of propylene oxide dissolved in 1000 parts of water are allowed to act on a solution of 690 parts of calcium cyanide in 4000 parts of water in the manner described in Example 1. A solution is obtained which contains 1370 parts of propylene cyanhydrin corresponding to a yield of 92 per cent of the theoretical yield, from which solution the cyanhydrin can be recovered by distilling off the water in vacuo; the cyanhydrin is a liquid boiling at 94° C. at 8 millimeters mercury gauge.

Example 3

A solution of 690 parts of calcium cyanide in 4000 parts of water is treated with 1080 parts of butylene oxide

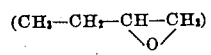

in the manner described in the foregoing examples. After stirring for three hours the reaction is completed and 1340 parts of butylene cyanhydrin with a boiling point of 113° to 115° C. (at 20 millimeters mercury gauge) can be recovered after the removal of the calcium compounds and evaporation of the solution obtained. In a corresponding manner other homologues of ethylene oxide can be converted into the corresponding cyanhydrin as well as derivatives of the alkylene oxides such as the hydroxy alkyl derivatives of alkylene oxides, such as glycide

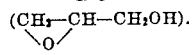

Example 4

A solution of 88 parts of ethylene oxide in 50 parts of water is allowed to flow while stirring at about 20° C. into a solution of 92 parts of calcium cyanide in 650 parts of water. Calcium hydroxide separates out. 54 parts of gaseous hydrocyanic acid are then led in and the calcium hydroxide passes into solution again. Another solution of 88 parts of ethylene oxide in 50 parts of water is then allowed to flow in and the precipitated calcium hydroxide is again caused to pass into solution by leading in 54 parts of gaseous hydrocyanic acid. This alternate leading in of hydrocyanic acid and allowing ethylene oxide to flow in is repeated until a total of 1804 parts of ethylene oxide and 1080 parts of hydrocyanic acid have been added. The temperature is kept at about 20° C. throughout the whole conversion by cooling. After allowing the solution to stand for about 24 hours, about 2860 parts of ethylene cyanhydrin (corresponding to a yield of about 96 per cent of the theoretical yield) are obtained in the form of an approximately 63 per cent solution of ethylene cyanhydrin.

The calcium hydroxide contained in the solution is precipitated as the carbonate by leading in carbon dioxide, and the solution of the cyanhydrin may then be directly employed for any desired conversions or worked up into anhydrous ethylene cyanhydrin.

Still further amounts of hydrocyanic acid acid and ethylene oxide may be converted into ethylene cyanhydrin with the said amount of calcium cyanide if desired, and the addition of water to the calcium cyanide or to the ethylene oxide may be increased or diminished depending on the desired concentration of the reaction product. The ethylene oxide may also be led into the cyanide solution in the gaseous phase. When employing other alkylene oxides, as for example propylene oxide or butylene oxide, the corresponding alkylene cyanhydrins are obtained in an analogous manner. The equivalent amount of barium cyanide or strontium cyanide may be employed instead of the calcium cyanide and other diluents, as for example commercial alcohols, may be employed instead of the water not required for the reaction.

*Example 5*

A solution of 88 parts of ethylene oxide in 50 parts of water and 54 parts of gaseous hydrocyanic acid are alternately introduced at about 20° C. in the manner described in Example 4 into a solution of 98 parts of sodium cyanide in 230 parts of water until a total of 1760 parts of ethylene oxide and 1026 parts of hydrocyanic acid have been added. After 12 hours, the solution contains 2640 parts of ethylene cyanhydrin (corresponding to a yield of about 93 per cent of the theoretical yield), the content of ethylene cyanhydrin in the solution being about 68 per cent. Before further working up the solution, the alkali formed from the alkali metal cyanide may be neutralized with sulphuric acid if necessary.

Potassium cyanide or other alkali metal cyanides or alkaline earth metal cyanides may be employed in an analogous manner instead of sodium cyanide and the water may be replaced by alcohols or aqueous solutions thereof.

*Example 6*

A solution of 5 parts of calcium cyanide in 80 parts of water is added while cooling to a mixture of 189 parts of hydrocyanic acid, 308 parts of ethylene oxide and 900 parts of water. The temperature of the mixture is kept at from 20° to 30° C. After about 24 hours, 464 parts of ethylene cyanhydrin, corresponding to about 93 per cent of the theoretical amount, are formed. The lime is precipitated by passing in carbon dioxide for a short time.

Larger or smaller amounts of water than that specified may be employed, other diluents, as for example commercial alcohols, ethylene cyanhydrin and the like which contain the quantity of water required for the reaction according to the equations given in the description, may be employed and the alkaline earth metal or alkali metal cyanide or the corresponding hydroxides may be added in the solid form.

*Example 7*

Ethylene oxide and hydrocyanic acid are led in the vapor phase in the proportions (by weight) of 44:27 while cooling and stirring into a solution of 92 parts of calcium cyanide in 650 parts of water with such a velocity that the temperature is kept at about 20° C. The leading in is continued until 1760 parts of ethylene oxide and 1026 parts of hydrocyanic acid have been added. About 2720 parts of ethylene cyanhydrin, corresponding to about 96 per cent of the theoretical yield, are then formed in the form of a 77 per cent solution. The quantity of cyanide employed allows of bringing to reaction further quantities of ethylene oxide and hydrocyanic acid, as for example 60 equivalent proportions of each per each equivalent proportion of cyanide, corresponding to from 85 to 90 parts of ethylene cyanhydrin per each part of cyanide with a content of the resulting solution of cyanhydrin of more than 90 per cent. Similar results are obtained with barium, strontium, sodium or potassium cyanides.

What I claim is:—

1. The process for the production of alkylene cyanhydrins which comprises acting with an alkylene oxide on a dispersion of a cyanide of an alkali forming metal in an aqueous solvent.

2. The process for the production of alkylene cyanhydrins which comprises acting with an alkylene oxide on a dispersion of an equimolecular proportion of cyanide of an alkali forming metal in an aqueous solvent.

3. The process for the production of alkylene cyanhydrins which comprises acting with an alkylene oxide on an aqueous dispersion of an equimolecular proportion of an alkaline earth metal cyanide in an aqueous solvent.

4. The process for the production of alkylene cyanhydrins, which comprises acting with an alkylene oxide on a dispersion of a cyanide of an alkali forming metal in an aqueous solvent at a temperature between about 10° and 70° C.

5. The process for the production of alkylene cyanhydrins which comprises acting with an alkylene oxide and an about equimolecular proportion of hydrocyanic acid on a dispersion of a cyanide of an alkali forming metal in an aqueous solvent, the quantity of said cyanide employed being insufficient for complete conversion of the alkylene oxide into cyanhydrin.

6. The process for the production of alkylene cyanhydrins which comprises acting alternately with an alkylene oxide and about an equimolecular proportion of hydrocyanic acid on a dispersion of a cyanide of an alkali forming metal in an aqueous solvent, the quantity of said cyanide employed being insufficient for complete conversion of the alkylene oxide into cyanhydrin.

7. The process for the production of alkylene cyanhydrins which comprises acting with hydrocyanic acid on a dispersion of an hydroxide of an alkali forming metal, in an aqueous solvent, and with an alkylene oxide on the dispersion of cyanide formed.

8. The process for the production of alkylene cyanhydrins which comprises acting with hydrocyanic acid on a dispersion of a small quantity of an hydroxide of an alkali forming metal, in an aqueous solvent, and then with an alkylene oxide and about an equimolecular proportion of hydrocyanic acid on the dispersion of cyanide formed, the quantity of said hydroxide being so small that the cyanide formed from said hydroxide is insufficient for a complete conversion of the alkylene oxide into cyanhydrin in the absence of hydrocyanic acid.

9. The process for the production of ethylene cyanhydrin which comprises acting with about equimolecular proportions of ethylene oxide and hydrocyanic acid at about 20° C. on a from 10 to 20 per cent aqueous solution of a cyanide of an alkali forming metal.

10. The process for the production of ethylene cyanhydrin which comprises acting with about equimolecular proportions of ethylene oxide and hydrocyanic acid at about 20° C. alternately on an aqueous solution of calcium cyanide in a quantity insufficient for complete conversion of the ethylene oxide employed.

In testimony whereof I have hereunto set my hand.

REINHOLD FICK.